United States Patent [19]

Metcalf et al.

[11] Patent Number: 4,788,428

[45] Date of Patent: Nov. 29, 1988

[54] THERMODYNAMICS INFRARED IMAGING SENSOR

[75] Inventors: Travis W. Metcalf, El Cajon; Steven E. Moran, San Diego, both of Calif.

[73] Assignee: The United States of America as represented by the Secretary of the Navy, Washington D.C.

[21] Appl. No.: 708,136

[22] Filed: Mar. 4, 1985

[51] Int. Cl.⁴ .................. H01L 25/00; G02B 5/23
[52] U.S. Cl. .................................. 250/332; 250/330; 350/354
[58] Field of Search ............... 250/332, 330, 338 SE, 250/370 G, 338 R; 357/32, 28, 26; 350/354

[56] References Cited

U.S. PATENT DOCUMENTS

| | | | |
|---|---|---|---|
| 3,978,281 | 8/1976 | Burrer | 356/354 |
| 4,027,976 | 6/1977 | Amon | 356/4.5 |
| 4,153,370 | 5/1979 | Corey, III | 356/358 |
| 4,260,888 | 4/1981 | Holly et al. | 250/330 |
| 4,262,198 | 4/1981 | Gupta et al. | 250/340 |
| 4,304,458 | 12/1981 | Huignard et al. | 350/3.63 |
| 4,306,150 | 12/1981 | Dietz | 250/332 |
| 4,419,692 | 12/1983 | Modisette et al. | 358/113 |

FOREIGN PATENT DOCUMENTS

| | | | |
|---|---|---|---|
| 2915859 | 10/1979 | Fed. Rep. of Germany | 357/32 |
| 2129639 | 5/1984 | United Kingdom | 250/338 |

OTHER PUBLICATIONS

A. B. Fowler and R. W. Keyes, "Acoustic-to-Visible Image Converter" *IBM Technical Disclosure Bulletin,* vol. 13, No. 3, (Aug. 1970), pp. 633–634.

*Primary Examiner*—Stephen C. Buczinski
*Attorney, Agent, or Firm*—Harvey Fendelman; Thomas G. Keough; Edmund W. Rusche

[57] ABSTRACT

An infrared imaging system is presented wherein a visual image of a scene being viewed is obtained from the thermal energy radiated from said scene. The thermal energy radiated is focused onto a plurality of means for absorbing energy from the infrared radiation, specifically a two-dimensional array of gas cells with the front end being a rigid infrared transparent window, the sides being rigid, and the rear ends being flexible membranes. Infrared radiation absorbed by the cells causes changes in the thermodynamic pressure within each cell and consequent expansion of the flexible membrane on the rear end of each cylindrical cell. The deflection of these flexible membranes is monitored and measured by either a laser interferometer system or a solid state pressure sensing system. Measurement of this deflection represents the amount of infrared radiation received at each of the plurality of gas cells. The resultant intensity of the laser interference beam is monitored with a laser interferometer and a TV vidicon camera. This resultant intensity reflects the magnitude of deflection from the cells. The TV vidicon signal which monitors the resultant intensity is processed and transmitted for two-dimensional video presentation of the viewed scene.

20 Claims, 3 Drawing Sheets

THERMODYNAMICS INFRARED IMAGING SENSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to the thermal imaging of a scene being observed. More particularly, it concerns the monitoring by infrared means of the thermal energy radiated from a scene by a sensor which can be used passively for day or night imaging.

Present interest in viewing scenes in low light or at night have led to the development and consideration of many schemes for making such scenes visible to the human eye. Some methods are based on the method of utilizing an infrared radiation source to illuminate the scene to be viewed and then receiving the reflected infrared radiation which is transformed into a video sensor for viewing. As an alternative, other methods have developed techniques for passive day or night imaging.

One technique utilizes low light level television cameras. Low light level TV sensors are similar to any standard TV sensor but use an intensified vidicon that makes the sensors exceptionally sensitive to whatever amount of visible light that does exist. A major disadvantage is that the sensor does require some small amount of visible light; it will not operate in total darkness.

Another technique has been perfected through the use of pyroelectric vidicon TV cameras. Pyroelectric vidicon cameras are similar to standard TV cameras except that the target of the vidicon tube is sensitive to the thermal radiation emitted from the scene of interest. The pyroelectric vidicon camera may be utilized either in daylight or night conditions. It has a major disadvantage in that the pyroelectric vidicon camera lacks sensitivity and has poor resolution.

A further method is the forward looking infrared system (FLIR). The FLIR is the most sensitive method to date for detecting and imaging the thermal pattern of a scene of interest. Limitations with this technique are that the scene of interest has to be scanned across the detector and the detector needs to be cooled. These restrictions often cause FLIR reliability and maintainability to be poor. In addition, the expense of the FLIR system is high.

A need clearly exists for the development of a thermal imaging system for passive use in daylight or nighttime conditions, and a system that is capable of providing good resolution and sensitivity at a moderate cost.

SUMMARY OF THE INVENTION

The invention presented here provides an image of the thermal gradients in a scene being observed. By sensing the thermal energy radiated from the scene this sensor can be used passively either during the day or for nighttime imaging. The concept of the invention is based upon the thermodynamics principle that when an object or gas is heated, expansion occurs.

The heart of the invention is a matrix array which contains many small, separated gas cells. These cells when exposed to thermal or infrared radiation are subject to heating. The increase or decrease in the temperature caused by the energy absorbed by the cell will cause a correlated expansion or contraction of the gas contained in each cell. Each cell is constructed in a manner that the change in volume caused by changes in heating is reflected by the movement of a flexible end on the cell.

When the gas in the cell is heated, it expands, causing the flexible membrane to reflect a change in the length of the cell. The small increase, or decrease, is detected by a laser interferometer. These differing changes in length from each cell in the array are detected by the interferometer and then converted into electrical signals of a video nature which, after processing, allow visual display and viewing of the scene monitored.

The system basically comprises an infrared sensitive lens which focuses radiation from the scene of interest onto the gas cell array. The infrared beam is chopped before it is focused on the cell array. This is for the purpose of establishing a period of time wherein no intensity reaches the array and a quiescent background level measurement of the array condition can be made.

The cells in the array, when illuminated by the infrared radiation, will thermodynamically expand or contract according to the change in temperature. This expansion or contraction is reflected by the change in length of the cell. A coherent beam of light from a laser is treated interferometrically to detect the change in length of the gas cells in the cell array. A portion of the laser beam illuminates the cell array and is reflected off of the individual gas cells. The reflected beam is then focused through a visible light lens onto a sensing surface of a TV vidicon tube. A reference beam split from the original laser beam is also focused onto the vidicon tube. The sum of the reference beam and the reflected beam then constitutes an interferometric beam whose intensity is determined by the phase difference between the reflected beam and the reference beam. This phase difference, of course, reflects the change in length, and accordingly the amount of infrared energy absorbed by the gas cells.

A signal from the vidicon tube is fed to an analog-to-digital converter. A portion of the output digital signal is stored in a memory or delay device for a preselected amount of time. By this means the portion of signal from the vidicon which represents the quiescent background level can be stored in memory, and then later compared against the TV vidicon signal representing image signals from the scene of interest. By subtracting the background signal level from the active, scene related, signal level, a "calibrated" signal results which represents the actual intensity differences caused by thermal gradients in the original scene of interest. This signal is transmitted through a digital-to-analog converter to a video display for viewing by a human observer.

Alternatives exist to the laser interferometer method of monitoring the pressure or volume changes in the gas cells of the cell array. One alternative is to use a solid-state pressure sensor array which is capable of detecting the changes in volume or pressure in the gas cells, and converting said changes into voltages which can be monitored by a charge coupled device. The signal from the charge coupled device is then serially fed to the analog-to-digital converter and processed as before to be read out visually at a display unit.

OBJECTS OF THE INVENTION

An object of the invention is to provide a system for imaging thermal gradients in a scene to be observed either during daylight or at nighttime.

A further object of the invention is to provide a passive thermal imaging system which senses the thermal energy radiated from a scene and processes it to be monitored in the visible region.

Another object of the invention is to provide an infrared imaging system which is based upon the thermodynamic principles involved when the received infrared radiation interacts with an array of many individual gas cells, the cells are heated with expansion occurring, and by monitoring said expansion a measure of the thermal gradients in the scene being observed is obtained.

These and other objects of the invention will become more readily apparent from the ensuing description when taken with the appended drawings.

DESCRIPTION OF THE PREFERRED EMBODIMENT

The thermodynamic infrared imaging sensor provides an image of the thermal gradients in a scene being observed by passively monitoring the thermal energy radiated from the scene either during daylight or nighttime conditions. It comprises a means for receiving infrared radiation from the viewed scene and focusing the radiation onto an image plane. A two-dimensional array of gas cells is located at the image plane. Each gas cell absorbs heat from the radiation focused on it. Therefore, each cell undergoes thermodynamic pressure and volume changes according to the particular thermal radiation it receives from a part of the viewed scene.

A means which measures these thermodynamic changes for each cell, and transforms such changes into electrical output signals, is attached to the two-dimensional gas cell array. The electrical output signals maintain the original two-dimensional alignment and orientation of the gas cell array. A means for processing the electrical signals is employed before the signals are transmitted to a visual display which reflects the infrared image contained in the original scene.

Figure 1:
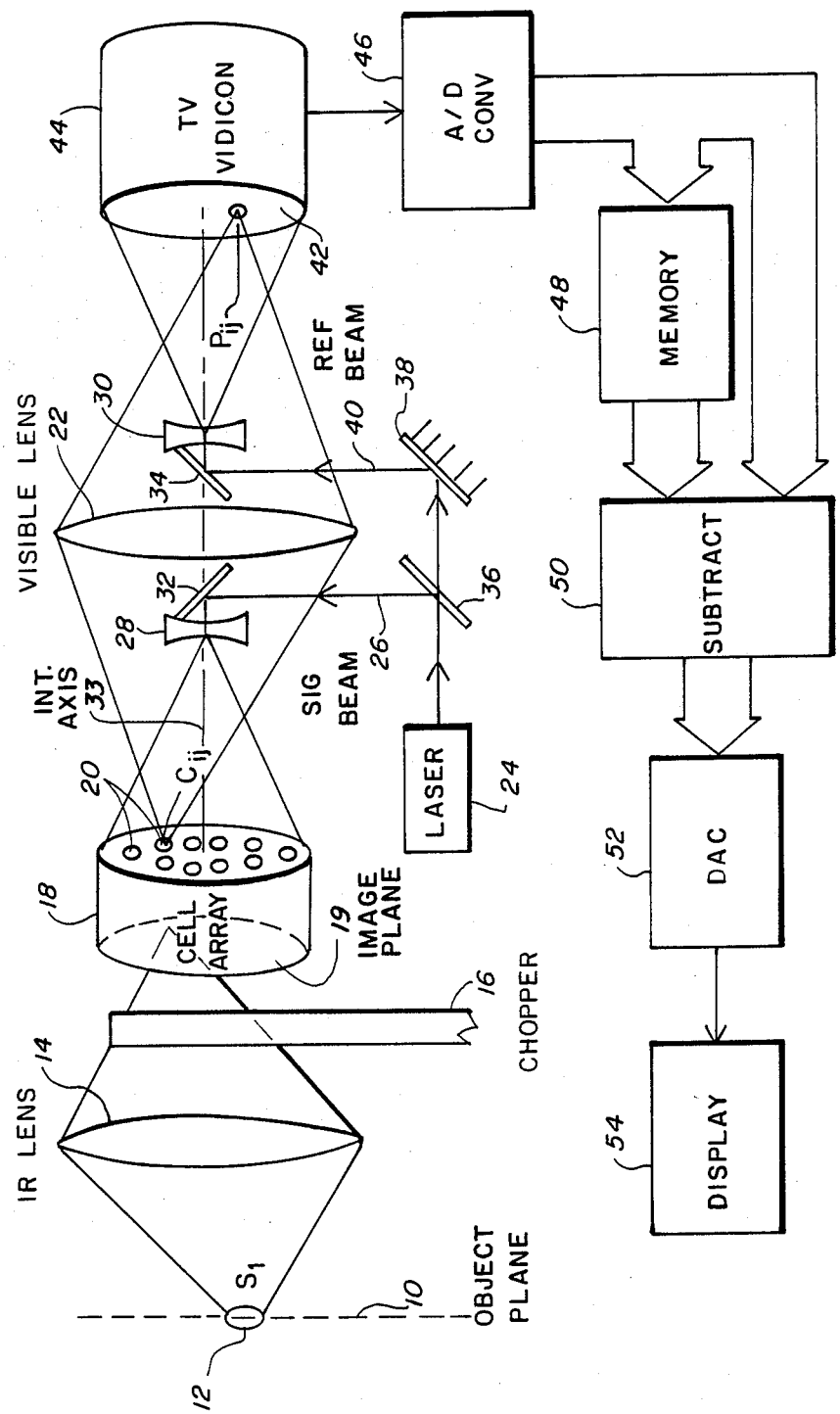
FIG. 1 shows the infrared imaging system containing the gas cell array with a laser beam interferometer.
Figure 2:
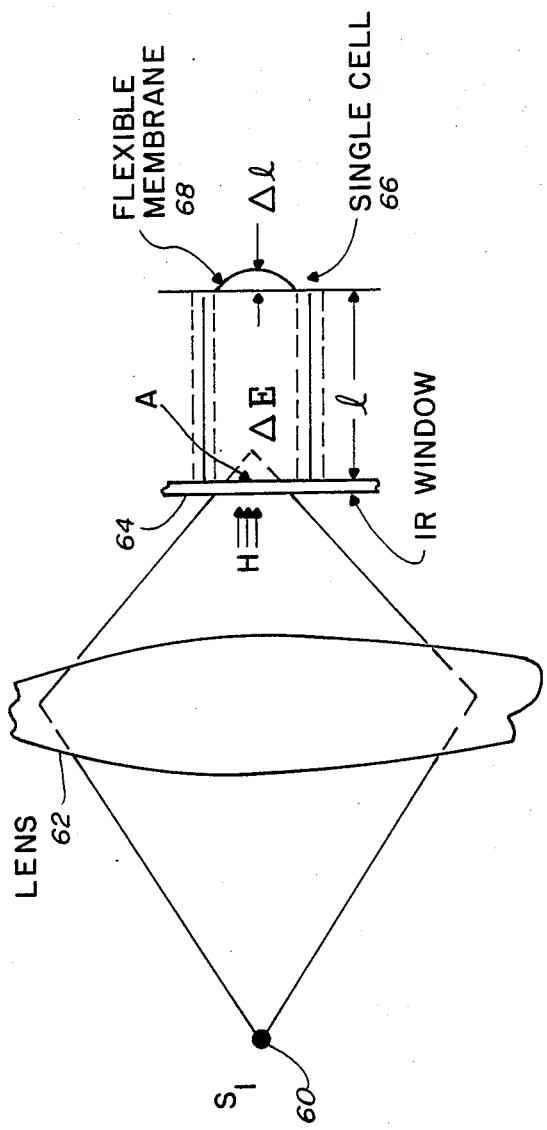
FIG. 2 shows the thermodynamic principles and equations associated with focusing the imaged infrared radiation onto the single gas cells thereby causing thermal expansion of the cells.
Figure 3:
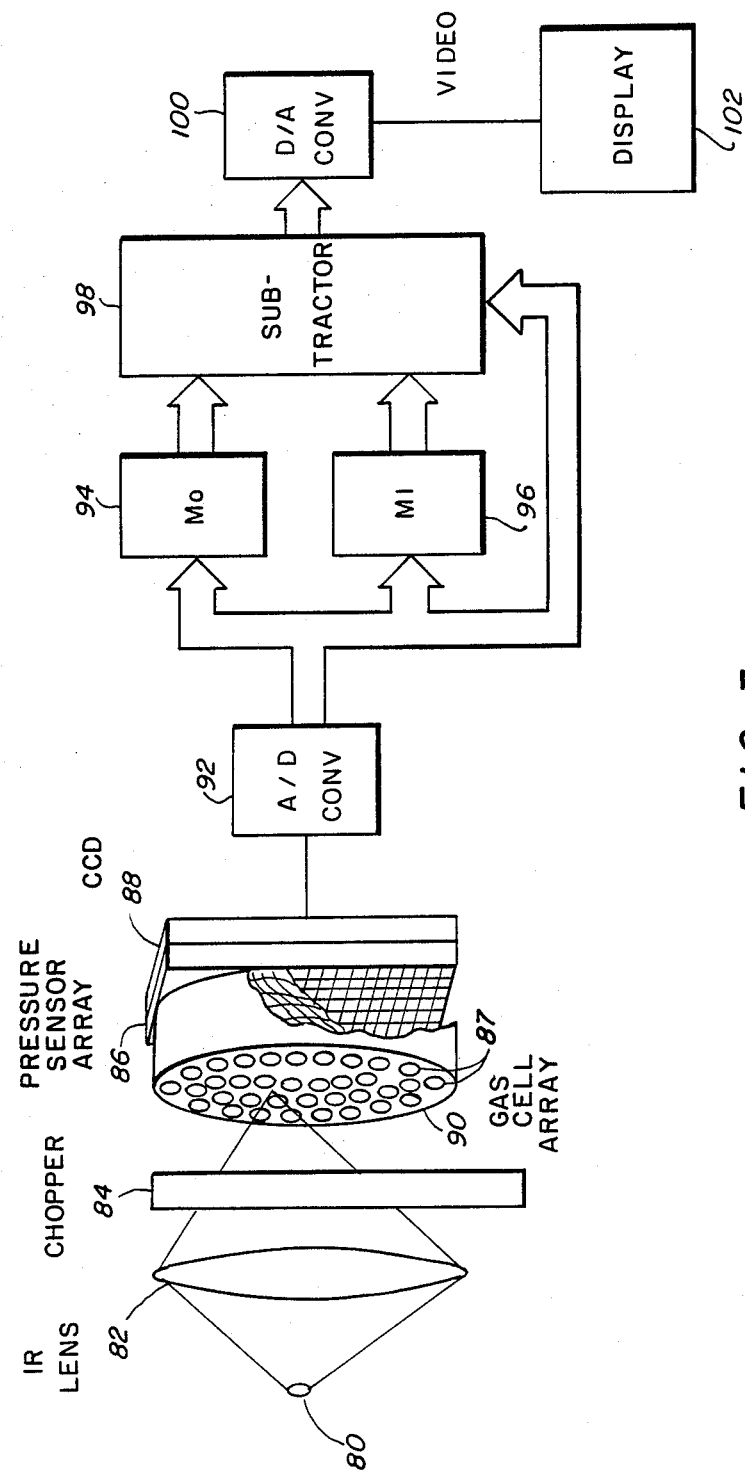
FIG. 3 displays an alternative embodiment of the system wherein a solid state sensor array and a charge coupled device is utilized to detect and measure the pressure differences in the gas cells caused by the incident infrared radiation.

Embodiments of the inventional concept are presented in FIGS. 1 and 3. FIG. 2 presents a description, including formulas, of the physical thermodynamic principles applied to an individual gas cell 66.

The concept of the invention is based upon the thermodynamic principle that when an object is heated, more particularly a gas contained within a closed cell, pressure and temperature changes occur which can be easily measured. If the gas is contained within a cell 66 which is flexible, then the general effect of the heating is observed in the expansion that occurs to the cell volume.

The principle of this invention is illustrated in FIG. 2. Gas cell 66 defines a more or less fixed volume of cylindrical shape with a length 1 and surface area A on each end. The cylindrical wall of the cell is rigid and will not alter shape under changes in pressure. An infrared window material 64 makes up the end of the cell that receives the incoming infrared radiation. The other end of the cell is closed off by a flexible membrane 68.

The source of infrared radiation 60 is shown as $S_1$. The thermal scene to be observed or imaged can be considered as comprising many sources $S_1$ arising at every possible location within the scene being monitored. Radiation from any one source $S_1$ will be focused by lens 62 to impinge upon a single gas cell 66. The incoming or incident radiation H penetrates the infrared window 64 through the area A and causes heating to occur to the gas contained within the cell. When the gas is heated the internal pressure increases. This increase in pressure will cause a concurrent expansion in volume which causes deflection of the flexible membrane 68. The amount of expansion or deflection at this end is identified as a change in length $\Delta l$.

Relevant thermodynamic equations are presented on FIG. 2 by equations 1 through 7. The symbols and terms are defined as follows:

a. $l$ = length of cell 66 at quiescent condition. (Meters)
b. $T_a$ = temperature, in degrees Kelvin, of the gas at quiescent, or ambient conditions.
c. $\Delta T$ = change in the temperature of the gas in the cell 66.
d. $\Delta E$ = change in the thermal energy of the gas in the cell 66. (W-sec)
e. m = mass of gas in the cell 66.
f. $C_p$ = specific heat capacity of the gas. (J/G-DEG)
g. H = Irradiance from the elemental source $S_1$ falling on the window 64 of the cell 66. (W/m$^2$)
h. A = cross sectional area of the cell 66. (m$^2$)
i. $\Delta t$ = time the irradiance H is allowed to fall on the cell 66.
j. N = Radiance emitted by the source $S_1$ (W-sec/m$^2$)
k. h = Planck's constant = $6.63 \times 10^{-34}$ J-sec
l. c = speed of light = $3 \times 10^8$ m/sec
m. $\lambda$ = wavelength of radiance. (meters)
n. k = Boltzmann's constant = $1.38 \times 10^{-23}$ JOULE/K
o. $T_s$ = temperature of source $S_1$ (K)
p. BW = Bandwidth or range of wavelengths of the energy radiated from the source $S_1$, centered at $\lambda$.
q. $f_n$ = characteristic of lens 62
r. D = density of gas.

Equation 1 on FIG. 2 presents the equation of state for the thermodynamic behavior of the gas cell 66 by relating the pressure, P, volume, V, and absolute temperature, T. The mass of the gas contained in the cell 66 is represented by $\eta$. The constant of proportionality is the universal gas constant, R.

Equation 2 shows the change $\Delta l$ which will occur in the length of the gas cell 66 as caused by a change in temperature within the gas cell of $\Delta T$ when referenced against some predetermined quiescent or ambient temperature $T_a$. Equation 3 is the relation between the change in temperature and the amount of energy, $\Delta E$, which is absorbed by the gas in the cell 66 from the infrared radiation. Equation 4 is the relation between the amount of energy absorbed by the gas cell 66 and the interval of time, $\Delta t$, during which the cell is exposed to the infrared radiation.

Equation 5 shows how to calculate the irradiance from the radiation of source S1 that will fall on the cell area A. Equation 6 provides the equation for calculating the radiance emitted by the source S1. Equation 7 is a final equation for calculating the amount of change in a length that occurs to the gas cell 66 as caused by the thermal energy radiated by source S1.

FIG. 1 shows the preferred embodiment of the system making use of the principle of the expansion of the gas cell 66 wherein a laser interferometer is utilized to measure the change in cell length $\Delta l$. An elemental source S1, 12, from the viewing scene is shown on an object plane 10 in the viewing scene. The radiation from source 12 is focused by an infrared lens 14 onto the cell array 18.

The cell array 18 is designed to contain hundreds of thousands of gas cells 20 similar to the one, 66, shown in FIG. 2. Accordingly, for purposes simplifying this description, it is presumed that the irradiance from source 60 is focused onto the infrared window 64 at the receiving end of a single cell 66.

The cell 66 will contain a gas selected for its expansion and thermoconductance properties. The infrared transmitting window 64 is of a material such as germanium.

The gas within the cell 66 is heated by the energy focused to enter the cell through the infrared transmitting window 64. The heated gas expands and causes the flexible membrane 68 at the opposite end of the gas cell 66 to expand, resulting in an increase in length of the cell by a factor of $\Delta l$. This small increase in length is detected by a laser interferometer.

Referring back to FIG. 1, the laser interferometer comprises the components of the laser 24; a beam splitting mirror 36; mirrors 32, 34, and 38; lenses 28 and 30; and visible lens 22. The gas cells 20 of cell array 18 and the sensor surface 42 of a TV vidicon tube 44 also become part of the action of the laser interferometer.

The narrow beam of light emitted by laser 24 is split into a signal beam 26 and a reference beam 40 by a beam splitting mirror 36. The signal beam is expanded by a divergent lens 28 and mirror 32 assembly to flood illuminate the flexible membrane surfaces (68, FIG. 2) for all gas cells 20, FIG. 1, aligned in the cell array 18. The flexible membranes 68, FIG. 2, on each gas cell 66 are of a material that readily reflects the coherent light from the laser.

Reference beam 40, FIG. 1 from the laser 24 is reflected by mirror 38 and mirror 34 to align it with the interferometer axis 33 between cell array 18 and TV vidicon 44. After mirror 34, divergent lens 30 expands the reference beam 40 to flood illuminate face 42 of vidicon 44.

The expanded laser beam impinging on the cell array 18 is reflected off the individual cells 20 into the hemisphere to the right of the cell array. The portion of light reflected by the cell array 18 and subtended by lens 22 is focused onto face 42 of TV vidicon 44. A particular component of the signal beam 26 which is reflected off a specific cell 20, such as at $C_{ij}$, is focused by lens 22 to the point $P_{ij}$ on sensor face 42 where it is mixed with the reference beam 40 which floods the face of the TV vidicon 44.

At this point, the amplitude and phase of the reflected signal beam and the reference beam 40 are interferometrically added together. Consequently, the intensity at point $P_{ij}$ is dependent on the relative phase relationship between the two beams. As the particular cell 20 at $C_{ij}$ expands by an amount $\Delta l$, the optical path length between the end of the cell 20 and the face of the TV vidicon 44 decreases by the amount $2\Delta l$. This change in path length results in a change in the phase relationship between the signal beam 26 and the reference beam 40. The maximum intensity at the point $P_{ij}$ will occur when the signal and reference beams are in phase. The intensity will vary from this high as the phase differs between the two beams, 26 and 40, as caused by expansion or contraction in the gas cells.

The change in intensity at the point $P_{ij}$ on vidicon 44 will be maximum when the change in length $\Delta l$ of the cell 20 is equivalent to one-fourth of a wavelength of the laser light. For a He Ne laser, a maximum change in intensity occurs when $\Delta l$ equals $1.6 \times 10^{-7}$ meters.

A chopper means 16 is inserted between infrared lens 14 and cell array 18. This chopper means 16 controls the incoming thermal radiation so that it can be blocked for preselected periods of time to provide an opportunity for establishing calibration of the system. When chopper 16 blocks radiation from scene 10 the cells 20 in array 18 stabilize at a quiescent state. The intensity pattern on the face 42 of TV vidicon 44 will adjust uniformly to the more-or-less constant intensity pattern reflected by the quiescent state among all cells 20 in the array 18.

This condition, then, provides a short interlude and reference level against which a basic calibration may be established. Measurements directly from the radiating scene will necessarily be relative in nature to this calibration point.

As long as changes in phase between the signal beam 26 and the reference beam 40 remain between 0 and 1 wavelength no problem arises. However, should the changes in phase exceed a wavelength, then ambiquity in the output of the interferometer measurements occur. Methods are available to account for such ambiguities, and means to correct for these ambiguities are readily integrated into the invention's design, if necessary.

TV vidicon 44 converts the visual image received on its sensor face 42 into a serial electrical signal which is transmitted to an analog-to-digital converter 46. The output from analog-to-digital converter 46 follows two paths. One path is to a memory unit 48, and the second path bypasses the memory unit 48 going directly to a subtractor element 50. The output from the memory 48 also inputs the subtractor unit 50.

When chopper means 16 blocks radiation from the scene, the gas cells 20 in array 18 stabilize at a quiescent state. The image of the intensity pattern from this quiescent state is stored in memory 48. Chopper means 16 is designed to periodically block and pass the incoming infrared radiation.

When the chopper 16 is in the pass mode the active signal now output by TV vidicon 44 through A/D converter 46 is fed simultaneously with the quiescent pattern stored in memory to subtractor 50. The quiescent pattern signal is subtracted from the active input by the subtractor 50 with the difference representing a calibrated measure of the intensity pattern radiated by the scene. The difference between the stored and live (or active) intensity pattern due to reflections of any particular gas cell 20 in the cell array 18 could be either positive or negative depending on whether the phase difference between the reference beam 40 and the signal beam 26 is increasing or decreasing. It is the magnitude of the difference that is important, and not the polarity. Therefore, the absolute value of the resultant of the subtraction process is fed to a digital-to-analog converter 52 and on to a visual display 54.

The output from digital-to-analog converter 52 is a video signal which is added to a composite sync signal and then fed to a standard TV monitor for visual display. Clearly, the output signal could also be fed to further processing systems, either in digital or analog form, for processing to other specific goals.

The thermal response of the cell array 18 is expected to be relatively slow. In particular, the time required for the cell 20 to return to its quiescent state is expected to be about one second after the chopper 16 blocks the radiation. By introducing small metallic particles into the gas cells it should be possible to reduce the thermal response time. Although not shown, this would be accomplished by establishing a magnetic field around the cell array 18 that causes the metallic particles to move about in the cell 20 parallel to the flexible membrane (68, FIG. 2) to enhance absorption of the heat from the gas. This phase would be timed to occur during the time the chopper means 16 blocks radiation to the cell array 18.

When the chopper 16 changes to allow the radiation to pass and illuminate the cell array 18, the magnetic field is altered such that the metallic particles are forced against the sides of the cell. The heat absorbed by the particles is dissipated into the walls of the cell 20.

Another method which can be used to increase the cells 1 thermal sensitivity is to replace the thin honeycomb structure of the gas cells array 18 with holes filled with a material preselected for its high thermal expansion properties. Therefore, by judicious design and selection of materials for this alternate array, the dynamic range and performance characteristics of the array for detecting incident infrared radiation can be tailored to match a variety of required specifications.

An alternative embodiment for the thermodynamic infrared imaging sensor is shown in FIG. 3. Its design does not require use of the laser interferometer for measuring the expansion or contraction of the gas cells 87. Rather, a pressure sensor array 86 made up of state-of-the-art solid state sensors fabricated to measure pressure differentials is attached to the pressure sensor array 86 in a manner that the flexible rear surfaces of the individual gas cells 87 are mated against individual solid state pressure sensors. The solid state pressure sensors monitor the deflection of each gas cell 87 and convert the deflection, which is related to the pressure change, to an electrical voltage. The electrical voltage for each sensor is applied to control a charge coupled device 88.

The charge coupled device 88 is also configured as a matrix array to match the pressure sensor array 86. A serial signal is output from charge coupled device 88 and fed to an analog to digital converter 92. The output of the analog-to-digital converter 92 is again split into two parallel paths: one going into memory means 94 and the second either going directly to subtractor 98 or into a second memory means 96. If only memory means 94 is utilized, then the processing and function of the remaining elements shown in FIG. 3 are identical to the similar elements shown in FIG. 1.

Specifically, memory means 94 is used to store the signal which is emitted when the chopper 84 blocks the infrared incident radiating beam in order to establish a quiescent calibration period. At some later time, when active data is being fed to the subtractor 98, this calibrating data from 94 is simultaneously fed and subtracted by subtractor 98 from the active data. The output signal is a difference signal representing the thermal variations in the scene being observed, and it is fed through digital-to-analog converter 100 to a visual display 102.

In a preferred embodiment as shown in FIG. 3, concern must be directed to the possibility of the solid state sensors being sensitive to microphonics, i.e., to acceleration forces which could cause them to errantly register pressure changes. Such acceleration forces could be caused by the movement of the system as a whole. This problem can be overcome by using a special group of the solid state sensors as dummy elements for measuring such microphonics. The measured signals of interest, either calibration or active, would be adjusted by subtracting the microphonic output level and then passed on through A/D converter 92. The circuit for accomplishing this has not been shown but is considered clearly evident and easily established within the circuit presented. The resultant signals therefore would be cleared of any microphonic interference as it might occur in real time.

Microphonic error signals are not considered to be a problem in the gas cell embodiment using the laser interferometer shown in FIG. 1 for the reason that acceleration problems which affect the solid state sensor masses are of no effect on the laser beams. Changes in accelerating forces acting on the laser interferometer framework should not cause pressure differences between the separate cell measurements that would be detectable by the laser interferometer.

Other factors may effect the measurement of the displacement of the gas cells 20, which would include temperature, may need consideration. However, such effects are long term in nature and can easily be controlled by the proper housing that the entire system is encased within.

Of particular concern is the total dynamic range for which the system will measure effectively. In the embodiment displayed in FIG. 3 the entire dynamic range available to the system will depend upon the maximum pressure or displacement range that the solid state transducers 88 are capable of monitoring and measuring effectively. The dynamic range for which the laser interferometer system can work before ambiguity enters corresponds to $\Delta l$ equal to $\frac{1}{4}\lambda$ for the laser frequency. Values for $\Delta l$ of the flexible membrane (68, FIG. 2) greater than this length would mean repeating phases that have occurred before at lower level incoming infrared intensities. Therefore, operation beyond this physical limitation requires that means be provided to account for the particular ranges to which the phase difference applies in regards to the extension of the single gas cell's length, $\Delta l$.

Obviously, many other modifications and variations of the present invention are possible in the light of the above teachings. It is therefore to be understood that within the scope of the appended claims the invention may be practiced otherwise than as specifically described.

What is claimed is:

1. An infrared imaging system wherein a visual image of a viewed scene is obtained from thermal energy radiated from said scene, said system comprising:
   means for receiving and focusing infrared radiation from a viewed scene, said focusing of the radiation occurring at an image plane;

means located at the image plane for absorbing and thermodynamically converting the focused radiation into a measureable physical change of the absorbing means;

means connected to interact with the means for absorbing for measuring the physical change of the absorbing means, said means for measuring outputting a signal which represents the physical changes occurring over the entire image plane; and means for processing and visually displaying the signal output from the means for measuring, wherein said visual display is a two-dimensional representation of the image of the scene being observed;

wherein the means for measuring comprises an interferometer system which compares changes in phase between a reference beam and a signal beam of light which is reflected from said means for absorbing.

2. An infrared imaging system wherein a visual image of a viewed scene is obtained from thermal energy radiated from said scene, said system comprising:

a first means for focusing infrared radiation received from the viewed scene, said infrared radiation being focused onto an image plane;

a plurality of means for absorbing energy from the infrared radiation, said absorbing means being placed at the image plane in a predetermined geometrical configuration, wherein each means for absorbing undergoes changes in its dimension oriented perpendicular to the image plane as determined by the thermodynamic effects of the absorbed energy;

means for measuring the change in dimension of each of the plurality of means for absorbing;

means for converting measurements of the changes in dimension for each of the plurality of means for absorbing into an electrical signal wherein information on the change in dimension for every absorbing means at any point in time is accordingly embodied;

means for processing the electrical signal output from the means for converting, wherein said means for processing converts the electrical signal to a visual display format; and means for visually displaying the processed electrical signal output from said means for processing; and means for establishing a fixed reference dimension for the dimension oriented perpendicular to the image plane for each means for absorbing, such that when thermodynamic changes occur in said means for absorbing to their dimensions oriented perpendicular to the image plane, said measuring means will measure changes in dimensions relative to the fixed reference dimension;

wherein said plurality of means for absorbing comprises a plurality of gas-filled cells of cylindrical shape with front ends being flat, rigid, and transparent to infrared radiation and placed in the image plane in a manner that a two-dimensional planar array is formed by said gas-filled cells, with cell side walls being rigid and equal in length among the plurality of cells, and with rear ends being flexible with their outer surfaces capable of reflecting visible radiation, such that the flexible rear ends are caused to expand and contract by changes in pressure of the gas caused by the thermodynamic absorption of infrared radiation by the gas; and wherein the means for measuring comprises an interferometer system which compares changes in phase between a reference beam and a signal beam of light which is reflected from the rear ends of the gas filled cells.

3. An infrared imaging system according to claim 1 wherein the interferometer system comprises:

means for generating a coherent beam of light;

means for splitting the beam of light into two separate beams, a signal beam and a reference beam;

first means for directing the signal beam to illuminate and reflect off the reflecting surfaces on the rear ends of the cylindrical gas filled cells, such that the reflected signal beam becomes a spatial matrix of multiple sub beams each reflected from one of the gas cells;

second means for focusing the signal beam after reflection onto a sensing plane;

second means for directing the reference beam to illuminate the same area on the sensing plane as is illuminated by the signal beam after reflection by the gas cells and focusing by the second means for focusing, such that the resulting light intensity matrix at the sensing plane is the interferometric sum of the waveforms for both beams; and means for sensing the resultant light intensity matrix at the sensing plane, said sensing means also converting the resultant light intensity matrix to an electrical output signal which embodies the information in the intensity matrix in real time.

4. An infrared imaging system according to claim 3 wherein the means for processing comprises:

means which receives the electrical signal output from said means for sensing for storing a portion of the electrical signal a predetermined period of time;

means for subtracting connected to simultaneously receive an immediate electrical signal output from said means for sensing and a delayed electrical signal output from the means for storing, said means for subtracting obtaining the difference between the immediate electrical signal and the delayed electrical signal and then outputting the difference signal; and means for transforming the difference signal to an analog format for visual display.

5. An infrared imaging system according to claim 3 which further includes:

means for periodically blocking the passage of the infrared radiation from the viewed scene to said means for absorbing, such that when the incident infrared radiation is blocked all gas cells adjust to a common quiescent thermodynamic state which yields a stable and uniform expansion position for the reflecting surfaces of all gas cells in relation among themselves, and accordingly creates a reproducible calibration signal at the output of the sensing means.

6. An infrared imaging system according to claim 5 wherein the means for processing comprises:

means for storing a portion of the output electrical signal from the means for sensing, said portion being the electrical signal output when the means for blocking is blocking the incident infrared radiation from the viewed scene;

means, connected to the output of the means for sensing and the means for storing, for subtracting the stored signal from the immediate signal being output from the means for sensing, such that a difference signal results which represents infrared intensities of the immediate viewed scene referenced to the calibration signal from the means for storing; and means for transforming the difference signal to an analog format for visual display.

7. An infrared imaging system according to claim 6 wherein the means for sensing comprises:
a television vidicon unit.

8. An infrared imaging system according to claim 7 wherein the means for visually displaying comprises:
a television monitor.

9. An infrared imaging system according to claim 5 wherein the means for processing comprises:
an analog-to-digital converter connected to receive the signal output from the sensing means;
a memory device connected to receive digital signals from the analog-to-digital converter, said memory device storing a portion of the output electrical signal from the means for sensing which corresponds to time when the incident infrared radiation is blocked by the means for blocking;
a subtractor connected to simultaneously receive a signal portion stored in the memory device and the immediate signal from the analog-to-digital converter, said subtractor subtracts the stored signal from the immediate signal whereby a calibrated difference signal results when the stored signal represents portions of time when the means for blocking has blocked the incident infrared radiation; and
a digital-to-analog converter connected to receive the digital difference signal output from the subtractor, convert it to analog, and output it to said means for visually displaying.

10. An infrared imaging system according to claim 9 wherein the means for sensing comprises:
a television vidicon unit.

11. An infrared imaging system according to claim 10 wherein the means for visually displaying comprises:
a television monitor.

12. An infrared imaging system wherein a visual image of a viewed scene is obtained from thermal energy radiated from said scene, said system comprising:
a first means for focusing infrared radiation received from the viewed scene, said infrared radiation being focused onto an image plane;
a plurality of means for absorbing energy from the infrared radiation, said absorbing means being placed at the image plane in a predetermined geometrical configuration, wherein each means for absorbing undergoes changes in its thermodynamic state variables, pressure, volume, and temperature as caused by the effects of the absorbed energy;
a solid state sensor array placed in contact with the plurality of means for absorbing energy, said sensor array detecting changes in the thermodynamic state at each of the plurality of means for absorbing energy, said sensor array converting the thermodynamic parameters into an electrical voltage proportional to the magnitude of the amount of infrared radiation absorbed by the plurality of means for absorbing;
a solid state device for converting the matrix of voltage signals into a serial electrical output signal which contains information from all of the plurality of means for absorbing energy;
means for processing the electrical signal output from the means for converting, wherein said means for processing converts the electrical signal to a visual display format; and
means for visually displaying the processed electrical signal output from said means for processing; and
means periodically blocking the passage of the infrared radiation from the viewed scene to said means for absorbing, such that when the incident infrared radiation is blocked all gas cells adjust to a common quiescent thermodynamic state which yields a stable and uniform condition for the thermodynamic parameters converted to voltages for all gas cells in relation among themselves, and accordingly creates a reproducible calibration signal at the output of the solid state device for converting;
means, connected to the output of the solid state device for converting and the means for storing, for subtracting the stored signal from the immediate signal being output from the solid state device, such that a difference signal results which represents infrared intensities of the immediate viewed scene referenced to the calibration signal from the means for storing; and
means for transforming the difference signal to an analog format for visual display;
wherein the means for processing comprises;
means for storing a portion of the output electrical signal from the solid state device for converting, said portion being the electrical signal output when the means for blocking is blocking the incident infrared radiation from the viewed scene.

13. An infrared imaging system according to claim 12 wherein the means for sensing comprises:
a television vidicon unit.

14. An infrared imaging system according to claim 13 wherein the means for visually displaying comprises:
a television monitor.

15. An infrared imaging system according to claim 12 wherein the means for processing comprises:
an analog-to-digital converter connected to receive the signal output from solid state device for converting;
a memory device connected to receive digital signals from the analog-to-digital converter, said memory device storing a portion of the output electrical signal from the solid state device for converting which corresponds to times when the incident infrared radiation is blocked by the means for blocking;
a subtractor connected to simultaneously receive a signal portion stored in the memory device and the immediate signal from the analog-to-digital converter, said subtractor subtracts the stored signal from the immediate signal whereby a calibrated difference signal results when the stored signal represents portions of time when the means for blocking has blocked the incident infrared radiation; and
a digital-to-analog converter connected to receive the digital difference signal output from the subtractor, convert it to analog, and output it to said means for visually displaying.

16. An infrared imaging system according to claim 15 wherein the means for sensing comprises:
a television vidicon unit.

17. An infrared imaging system according to claim 16 wherein the means for visually displaying comprises:

a television monitor.

18. An infrared imaging system according to claim 17 wherein the solid state device for converting is a solid state charge couple device.

19. An infrared imaging system according to claim 17 wherein the plurality of means for absorbing energy comprise:

a plurality of gas filled cells of cylindrical shape with front ends being flat, rigid, and transparent to infrared radiation and placed in the image plane in a manner that a two-dimensional planar array is formed by said gas filled cells, with sidewalls being rigid and equal in length among the plurality of cells, and with rear ends being flexible, such that the flexible rear ends are caused to expand and contract by changes in pressure of the gas caused by the thermodynamic absorption of the infrared radiation by the gas.

20. An infrared imaging system according to claim 19 wherein the solid state sensor array comprises:

a matrix of sensors which geometrically are in contact with the plurality of gas filled cells, said sensors capable of detecting the deflection of the flexible rear ends for each gas cell and converting said deflection into a voltage signal representing the amount of deflection which is related to the pressure within the gas cell.

* * * * *